United States Patent
Fowler

(10) Patent No.: US 10,366,555 B1
(45) Date of Patent: Jul. 30, 2019

(54) ELECTROMECHANICAL LOCK SECURITY SYSTEM

(71) Applicant: Xerox Corporation, Norwalk, CT (US)

(72) Inventor: Jeffrey M. Fowler, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/879,974

(22) Filed: Jan. 25, 2018

(51) Int. Cl.
- G06K 5/00 (2006.01)
- G07C 9/00 (2006.01)
- E05B 47/00 (2006.01)
- G06K 19/12 (2006.01)

(52) U.S. Cl.
CPC ...... *G07C 9/00182* (2013.01); *E05B 47/0001* (2013.01); *G06K 19/12* (2013.01); *G07C 9/00857* (2013.01); *G07C 9/00563* (2013.01); *G07C 2009/00761* (2013.01)

(58) Field of Classification Search
USPC .............................. 235/382, 382.5
See application file for complete search history.

(56) References Cited

U.S. PATENT DOCUMENTS

| | | | |
|---|---|---|---|
| 4,347,545 | A | 8/1982 | Weishaupt et al. |
| 4,990,906 | A | 2/1991 | Kell et al. |
| 5,055,701 | A | 10/1991 | Takeuchi |
| 7,712,342 | B2 | 5/2010 | Loughlin et al. |
| 8,646,298 | B2 | 2/2014 | Lessels |
| 9,041,510 | B2 | 5/2015 | Wolski |
| 9,974,492 | B1 | 5/2018 | Dicks et al. |
| 2004/0128508 | A1* | 7/2004 | Wheeler ............ G06F 21/33 713/170 |
| 2004/0130437 | A1 | 7/2004 | Stevens |
| 2007/0283159 | A1 | 12/2007 | Borsa et al. |
| 2008/0087721 | A1* | 4/2008 | Van Breemen .. G06K 19/06009 235/380 |
| 2008/0111659 | A1* | 5/2008 | Pesapane ............ G07C 9/00103 340/5.6 |
| 2009/0160606 | A1* | 6/2009 | Miller ................ G07C 9/00817 340/5.54 |
| 2013/0043973 | A1* | 2/2013 | Greisen .............. G07C 9/00571 340/5.51 |

(Continued)

OTHER PUBLICATIONS

Allegion web page, Schlage overview "AD-250 Electronic Lock", downloaded Jan. 23, 2018, https://us.allegion.com/en/home/products/categories/electronic-locks/schlage-ad-250.html.

*Primary Examiner* — Tuyen K Vo
(74) *Attorney, Agent, or Firm* — Fox Rothschild LLP

(57) ABSTRACT

An electromechanical locking system includes one or more moveable locking elements and one or more actuators configured to move each of the one or more moveable locking elements between positions. The system includes an interface configured to receive information from a keycard, a processor, and a computer-readable storage medium. The processor causes the interface to scan the keycard and detect one or more features of the keycard when the keycard is detected by the interface, identify a first code that corresponds to the detected features of the keycard, apply functions to the first code to yield a second code that represents one of the plurality of positions for each of the one or more moveable locking elements, and cause the actuator to move the one or more movable locking elements to the one or more positions that correspond to the second code.

20 Claims, 12 Drawing Sheets

(56) References Cited

U.S. PATENT DOCUMENTS

2013/0182838 A1 7/2013 Kelley et al.
2016/0260268 A1 9/2016 Goldman
2016/0265253 A1 9/2016 Hild et al.

* cited by examiner

UNIT A

| KEY ID | PARENT | AUTHORIZATION | SALT | OFFSET |
|---|---|---|---|---|
| 1-1-1 | 1-1-1 | 1 | 3-1-1-3-3 | 3-3-1-3-2 |
| 1-1-2 | 1-1-2 | 3 | 3-2-2-1-1 | 1-1-1-1-3 |
| 1-2-1 | 1-1-1 | 2 | 3-1-2-3-2 | 1-2-2-2-1 |
| 1-2-2 | 1-1-1 | 2 | 2-2-1-2-2 | 3-3-3-3-1 |
| 2-1-1 | 1-2-1 | 3 | 2-1-3-1-3 | 1-3-2-2-2 |
| 2-1-2 | 1-2-1 | 3 | 1-1-3-2-2 | 2-2-2-2-3 |
| 2-1-3 | 1-2-2 | 3 | 3-1-3-1-3 | 2-3-1-2-3 |
| 1-2-3 | 1-2-2 | 3 | 2-1-1-1-3 | 3-1-3-1-2 |

COMMON SUITE

| KEY ID | PARENT | AUTHORIZATION | SALT | OFFSET |
|---|---|---|---|---|
| 1-1-1 | 1-1-1 | 1 | 1-2-1-1-2 | 2-3-2-2-3 |
| 1-1-2 | 1-1-2 | 3 | 1-2-2-2-2 | 3-1-3-2-2 |
| 1-2-1 | 1-1-1 | 2 | 2-1-1-1-3 | 1-2-1-1-1 |
| 1-2-2 | 1-1-1 | 3 | 3-3-2-1-1 | 3-2-2-1-2 |
| 1-2-3 | 1-1-1 | 3 | 1-3-1-2-1 | 1-1-3-3-3 |
| 2-1-1 | 1-2-1 | 3 | 3-2-1-2-3 | 3-2-2-3-3 |
| 2-1-2 | 1-2-1 | 3 | 3-2-2-3-2 | 2-2-1-3-3 |
|  |  |  |  |  |

UNIT B

| KEY ID | PARENT | AUTHORIZATION | SALT | OFFSET |
|---|---|---|---|---|
| 1-1-1 | 1-1-1 | 1 | 2-2-3-2-3 | 1-3-1-1-2 |
| 1-1-2 | 1-1-2 | 3 | 1-2-2-3-1 | 2-2-1-1-1 |
| 1-2-1 | 1-1-1 | 2 | 1-1-3-2-2 | 3-2-1-1-3 |
| 1-2-3 | 1-1-1 | 2 | 1-3-3-1-2 | 2-2-1-1-2 |
| 2-1-1 | 1-2-1 | 3 | 3-3-1-3-3 | 3-1-2-1-2 |
| 2-1-2 | 1-2-1 | 3 | 2-1-1-1-2 | 3-2-1-3-1 |
|  |  |  |  |  |
|  |  |  |  |  |

FIG. 8B

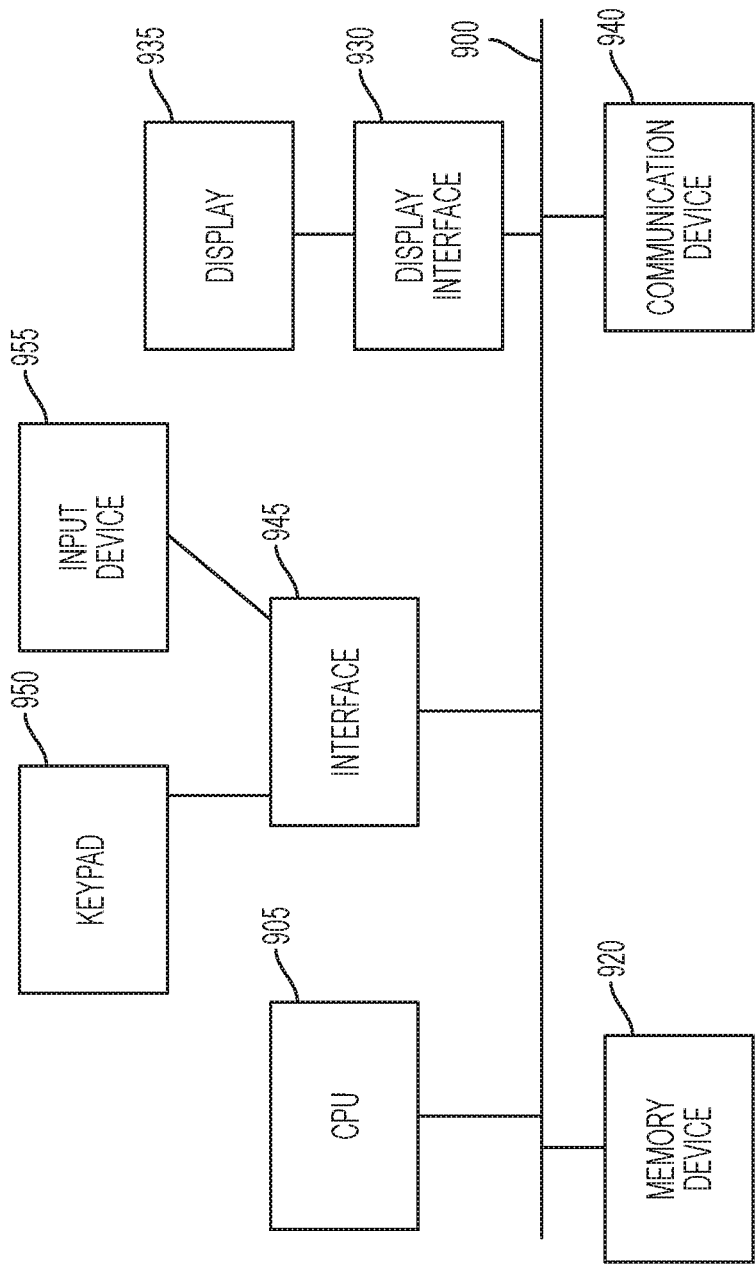

ELECTROMECHANICAL LOCK SECURITY SYSTEM

BACKGROUND

Homes, businesses and other critical infrastructure are often locked with outdated technology that offers only the appearance of security. While expensive lock systems may offer several minutes of penetration resistance, most locks can be breached by skilled thieves in seconds. Electronic locks can be bypassed without knowledge of the code, and master-key systems can be decoded.

Generally, a key or combination presents information to a lock. Using the tentative method of lock-picking, a lock-picker extracts other information from a lock in such a way to present an effective key or combination faster than using a brute-force approach. For instance, a lock-picker may bypass the presentation of a valid key. As an example, in a classic electronic lock, the combination can be compared to one or more valid codes. If the code is deemed valid, then a signal is generated to move a bolt by means of a servo-motor. However, a lock-picker may bypass the need for a valid code simply by causing the bolt to move by a different trigger, such as, for example, independently energizing the solenoid.

The present disclosure describes, among other things, a way to actuate an electromechanical lock using one or more transducers according to cryptographically filtered information that is presented by one or more factors of authentication. This approach is in contrast to directly actuating a bolt or other locking mechanism, as is common with traditional electromechanical locks. In addition, the methods of unlocking an electromechanical lock described in this disclosure are accomplished without the lock having access to its access code. Unlike traditional electromechanical locks that store an access code in memory and compare provided key codes to the stored access code to determine if they are the same, the locks described in this disclosure do not store or otherwise have access to their access codes because authorizing a provided key code is not performed based on a comparison to an access code. Rather, the provided key code is used to generate movement instructions that either cause the lock's locking mechanisms to move to a position that unlocks the lock if the provided key code is valid, or cause the lock's locking mechanisms to a position that does not unlock the lock if the provided key code is not valid. As such, the locks described in this disclosure are less susceptible to hacking and unauthorized access because the information known by and/or stored by the lock, even if breached, would be of little to no use to a lock-picker.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, an electromechanical locking system includes one or more moveable locking elements and one or more actuators configured to move each of the one or more moveable locking elements between a plurality of positions that comprise a locked position and an unlocked position. The electromechanical locking system also includes an interface configured to receive information from a keycard, a processor, and a computer-readable storage medium containing programming instructions. The programming instructions are configured to cause the processor to cause the interface to scan the keycard and detect one or more features of the keycard when the keycard is detected by the interface, identify a first code that corresponds to the detected features of the keycard, apply one or more functions to the first code to yield a second code, where at least a portion of the second code represents one of the plurality of positions for each of the one or more moveable locking elements, and cause the actuator to move the one or more movable locking elements to the one or more positions that correspond to the second code.

In some embodiments, the interface includes an optical sensor. The processor may cause the optical sensor to detect the first code that is encoded in an optical pattern of the keycard.

In some embodiments, the processor may obtain a salt value, append the salt value to the first code to generate a result value, hash the result value to generate a hashed value, retrieve an offset value, and apply the offset value to the hashed value to generate the second code.

In various embodiments, the processor may cause the interface to read information from a magnetic stripe of the keycard to obtain the first code. In other embodiments, the processor may cause the interface to read a printed memory label of the keycard to obtain the first code. In some embodiments, the processor may obtain the first code that is stored in a radio frequency identification tag of the keycard.

In some embodiments, the electromechanical locking system may include a second interface. The processor may receive, from the interface, first information, receive, from the second interface of the electromechanical locking system, second information, and derive the first code from at least a portion of the first information and at least a portion of the second information.

In some embodiments, the interface may include a magnetic stripe card reader, and the second interface may include a keypad or a biometric scanner. In other embodiments, the interface may include a radio frequency identification reader and the second interface may include a keypad or a biometric scanner.

In various embodiments, the processor may receive an instruction to enter a re-keying mode, detect a new keycard by the interface, cause the interface to scan the new keycard and detect one or more features of the new keycard, identify a first updated code that corresponds to the detected features of the new keycard, based on the first updated code, identify a new value that the system will then use with the function to generate the second code upon presentation of the new keycard, and store the new value in a memory.

BRIEF DESCRIPTION OF THE DRAWINGS

FIG. 8B illustrates example data stores according to various embodiments.

FIG. 9 illustrates a block diagram of example hardware that may be used to contain or implement program instructions according to an embodiment.

DETAILED DESCRIPTION

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like.

A "key" means a mechanism that presents information to a lock, or that can be interrogated by a lock, for the purpose of gaining access to a resource that the lock protects. For example, a key may be an object the presents an access code to a lock by means of one or more of its physical characteristics, such as, for example, its shape. A traditional physical key is an example of such a key. A key may also be a device that a lock can interrogate to obtain information. A keycard having a programmed memory chip, a radio frequency identification (RFID) tag, a magnetic stripe, printed memory and/or the like are examples of such a key. A key may be information provided by a user to gain access to a lock. A biometric, a manually-provided password or access code and/or the like are examples of such a key.

A "lock" refers to a mechanical and/or an electromechanical mechanism for restricting unauthorized physical access to a resource. Examples of locks include, without limitation, a pin tumbler lock, disc detainer lock, a combination lock and/or the like.

A "resource" refers to an object, a location or other item or property that is protectable by a lock. Example resources may include, for example, doors, vaults, lockers, drawers, windows, automobiles, bicycles, and/or the like.

Figure 1:
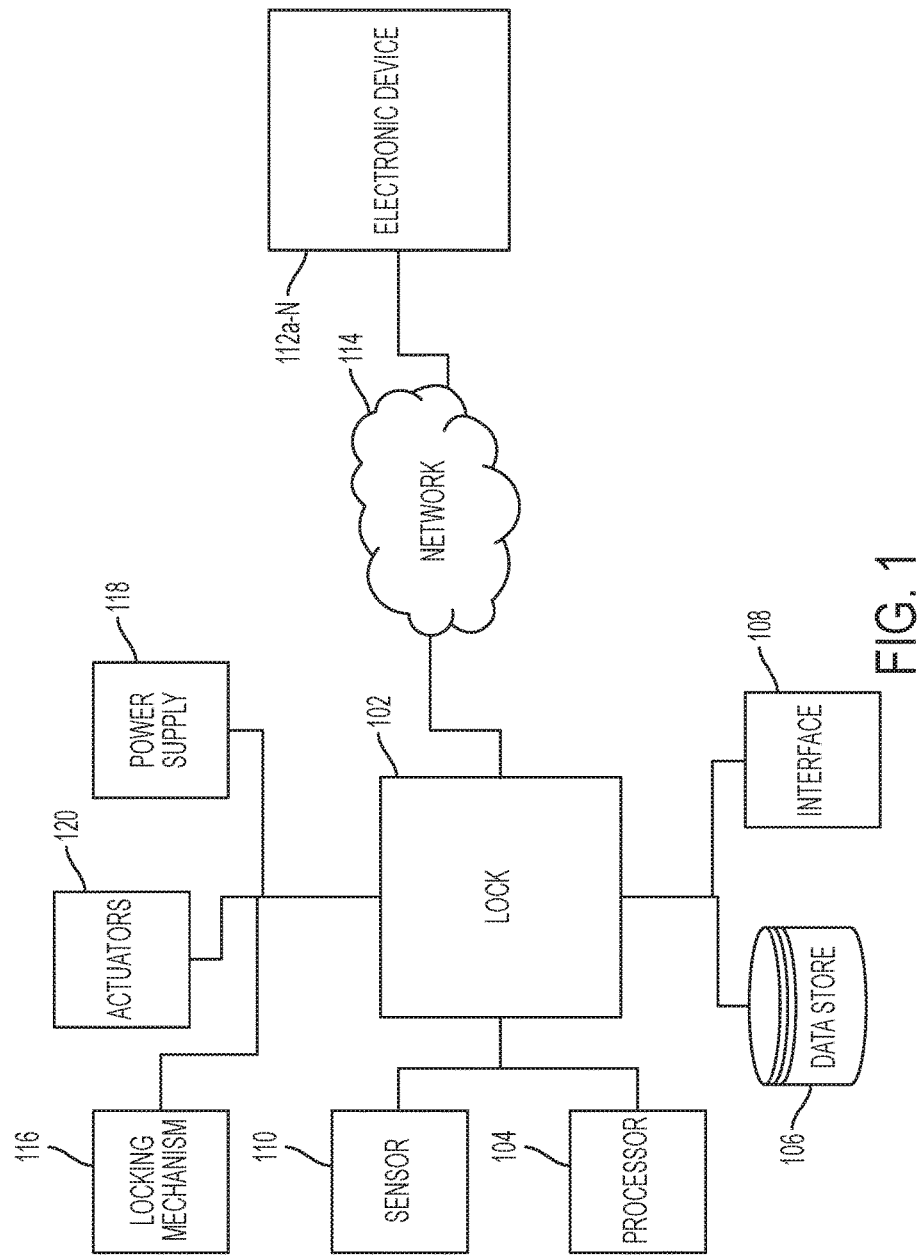
FIG. 1 illustrates an example electromechanical locking system according to an embodiment.

FIG. 1 illustrates an example lock system according to an embodiment. As illustrated by FIG. 1, a lock system 100 may include a lock 102. A lock restricts access to a resource. The lock 102 may include a processor 104 and one or more data stores 106. The lock may include one or more interfaces 108. An interface 108 refers to a device and/or mechanism by which a key is presented to the lock 102 to gain access to a resource that lock protects. Example interfaces may include, without limitation, a magnetic stripe reader, a printed memory label reading device, an RFID reader, a smartcard reader, a combination entry interface, a keypad, a touchscreen, a biometric scanner and/or the like. Alternatively, an interface may be a receptacle that is configured to receive a key.

A lock 102 may also include or communicate with one or more sensors 110. A sensor 110 refers to a mechanism that detects information from a key. Example sensors 110 may include, without limitation, one or more optical sensors, electrical sensors, receivers, transponders, transducers and/or the like. A sensor may be part of the interface 108 and thus detect insertion of a key into the interface, or it may be a near-field or short-range communication sensor configured to detect when a key is proximate to the sensor by being within the sensor's communication range. In various embodiments, the sensor(s) 110 and moveable locking element 116 are not mechanically interconnected, which may prevent tampering with one or more moveable locking elements 116. As such, it is not mechanical interconnection between a key and moveable locking elements 116 that causes the moveable locking elements to change position. Rather, a locking system uses information obtained from a key to cause one or more actuators to adjust the position of the moveable locking elements.

As illustrated by FIG. 1, a lock may include one or more locking mechanisms 116. A moveable locking element 116 refers to a moveable portion of a lock that blocks or prevents access to a resource until the lock 102 allows it to be withdrawn or opened. As such, moveable locking elements 116 may be associated with a locked position and an unlocked position. For example, a moveable bolt may be an example of a moveable locking element 116. As another example, one or more pins of a pin tumbler lock are also examples of a moveable locking element 116. The moveable locking element may also include a stationary receptacle or clamp to receive a pin, a bolt, or other moveable element. Alternatively, the receptacle may be moveable and the bolt, pin or other moveable element may be stationary. Additional and/or alternate moveable locking elements, such as a moveable core of a solenoid, or configurations may be used within the scope of this disclosure.

A lock may include one or more actuators 120. An actuator may be in communication with the processor of a lock, and may control the movement of one or more of the moveable locking elements 116 in response to one or instructions received from the processor. Examples of actuators include, without limitation, springs, levers, transducers, servomotors and/or the like.

In various embodiments, a lock 102 may be in communication with one or more electronic devices 112a-N via a communications network 114. The lock 102 may be managed, operated and/or controlled remotely via one or more electronic devices 112a-N. A communication network 114 may be a local area network (LAN), a wide area network (WAN), a mobile or cellular communication network, an extranet, an intranet, the Internet and/or the like.

A lock 102 may have a power supply 118, as illustrated by FIG. 1. Example power supplies 118 include, without limitation, a battery, a mains power supply, or a photovoltaic cell. As another example, a power supply 118 may be a dynamo that harvests energy from inserting a key or, with respect to door locks, from turning a door handle or opening the door. As another example, a key may include a battery that is used to charge the lock when the key is inserted into the lock. The battery may be rechargeable.

The electromechanical locking systems described in this disclosure may be used in a variety of different environments. For instance, the described electromechanical locking systems may be used to lock one or more doors, windows or other access points in apartment complexes, universities, offices, hospitals, hotels, retail environments, homes, vehicles, and/or the like. The electromechanical locking systems described in this disclosure may be compatible with technologies that protect against key cloning such as, for example, code cycling technologies, cryptographic technologies and/or the like.

Figure 2:
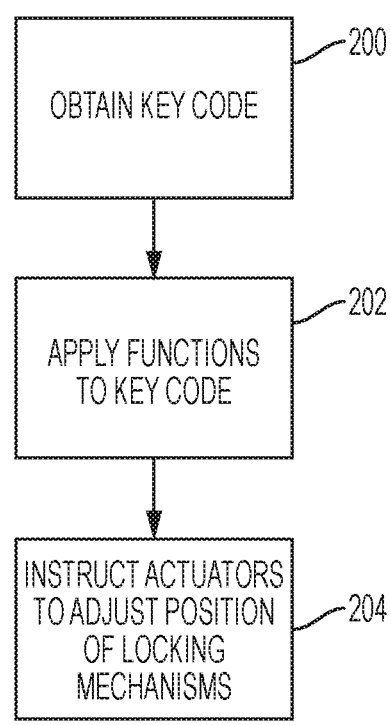
FIG. 2 illustrates an example method of attempting to access a resource that is protected by an electromechanical locking system according to an embodiment.

FIG. 2 illustrates an example method of attempting to access a resource that is protected by a lock according to an embodiment. As illustrated by FIG. 2, a lock may receive or obtain 200 a key code associated with a key that is presented to the lock. The key may be presented to the lock in an attempt to access the resource that the lock is protecting. For example, if a lock is being used to restrict access to the front door to a home, a person may present a key to the lock in order to gain access to the front door.

A key code refers to data presented to a lock via a key to gain access to the lock. In various embodiments, a key code may include an optical pattern. An optical pattern refers to an optical representation of data presented in a sequence or other pattern which can be read by an optical sensor. Examples of optical patterns include, without limitation, bar codes, Quick Response (QR) codes, data codes and/or the like. An optical pattern may be encoded on a key, embedded in a key or printed on a key. When the key is presented to a lock, such as, for example, via an interface of the lock, one or more optical sensors of the lock may detect the key code from the key. For example, when a key is inserted into a receptacle of a lock, the processor of the lock may cause an optical sensor to scan the key and detect one or more optical patterns.

As another example, a key code may be encoded as one or more physical features of the key. For instance, a key code may be encoded in physical features of a key such as dimples, indentations, or grooves that are cut into the key. The sequence or pattern of dimples, indentations, or grooves may represent a sequence or pattern of data representative of the key code. When the key is presented to a lock, such as, for example, via an interface of the lock, one or more optical sensors of the lock may detect the one or more dimples, indentations or grooves from the key to obtain the key code represented by such dimples, indentations or grooves.

In an embodiment, a key code may be one or more patterns of conductivity that is printed, cut or masked onto a key. For example, electronic functional ink may be used to print one or more patterns onto a key. The electronic functional ink may exhibit high conductivity. When a reader applies current to the ink, it may exhibit one or more patterns that represent a key code. Alternatively, one or more conductive elements, may be embedded in a key in a pattern that represents a key code. For instance, a key card composed of a plastic substrate may one or more conductive wires embedded into the key. When a reader applies current to the key, the conductive elements may exhibit one or more patterns representative of a key code.

When the key is presented to a lock, one or more electrical sensors of the lock may detect one or more patterns of conductivity to obtain the key code.

In an embodiment, a key code may be encoded as data into a magnetic stripe of a keycard. When the keycard is presented to a lock, a magnetic stripe reader may read the key code from the keycard. In other embodiments, a key code may be encoded within at least a portion of a QR code. In other embodiments, a key code may be contained within one or more micro-circuits of a key, such as a keycard.

As another example, a key code may be within a digital label of a key, such as a keycard. In certain embodiments, a digital label may be a printed memory label, such as Xerox Printed Memory. A printed memory label is a secure, printed electronic label that includes rewritable memory to store information. For instance, Xerox Printed Memory may store bits of data in the orientation of certain molecules in one or more layers of a printed memory label. When the key is presented to a lock, an interface of the lock may read the printed memory label to obtain the key code.

In an embodiment, a key code may be stored on an RFID tag of the key. An RFID tag may be an active tag, a passive tag, and/or a semi-passive tag. An RFID tag may be fabricated from silicon, printed circuitry and/or the like. When the key is presented to a lock, an RFID reader of the lock may obtain the key code from the RFID tag.

As yet another example, a key code may be provided by a user of a lock. For instance, a user may enter a key code via an interface of a lock such as, for example, a keypad or touchscreen. In an embodiment, a user may provide a key code to an application on a user's electronic device, such as, for example, a smartphone. The electronic device may send the provided key code to the lock.

In another example, a key code may be biometric data presented by a user. For example, a scanning device of a lock may receive biometric data from a user such as, for instance, an iris scan, a fingerprint scan and/or the like.

In yet another example, a lock may receive a key code from a remote electronic device over a communication network. For instance, a maintenance worker at an apartment may need to access an apartment to address an emergency and may not have access to a master key. Building security may remotely send a key code to unlock the lock or to temporarily authorize the maintenance worker's key to access the specific apartment. In another embodiment, building security may temporarily and remotely authorize the maintenance worker's key for the specific apartment.

Figure 3A:
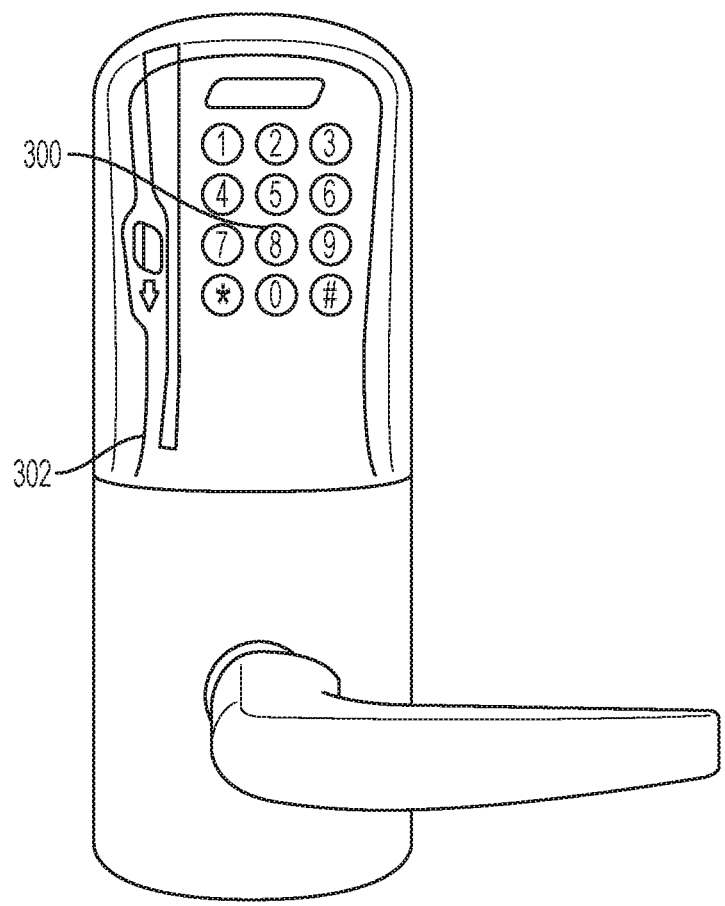
FIG. 3A illustrates an example electromechanical locking system according to an embodiment.
Figure 3B:
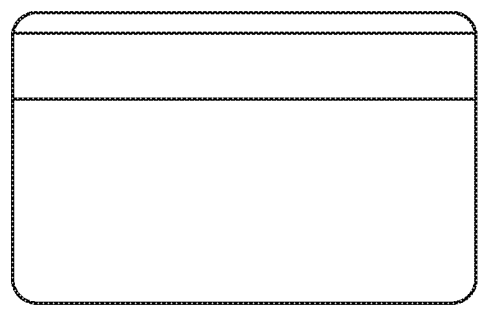
FIG. 3B illustrates an example magnetic stripe card according to an embodiment.

In various embodiments, an electromechanical locking system may require multi-factor authentication to unlock the lock. In this situation, a key code may be information that is derived, compiled or aggregated from two or more different sources or interfaces. For example, an electromechanical locking system may include a keypad 300 and a magnetic stripe card reader 302 as illustrated by FIG. 3A. A user wanting to gain access to the locking system must present both a magnetic stripe card via the magnetic stripe card reader and a personal identification number (PIN) via the keypad. For instance, the electromechanical locking system illustrated in FIG. 3A may be present on a hotel room door. A guest may be required to present a magnetic stripe card, such as a hotel key card provided by the hotel, to the magnetic stripe card reader 302, and a PIN, which may also be provided to the guest by the hotel upon check-in, via the keypad 300. FIG. 3B illustrates an example magnetic stripe card according to an embodiment.

Figure 4B:
FIG. 4B illustrates an example radio frequency identification card according to an embodiment.
Figure 4A:
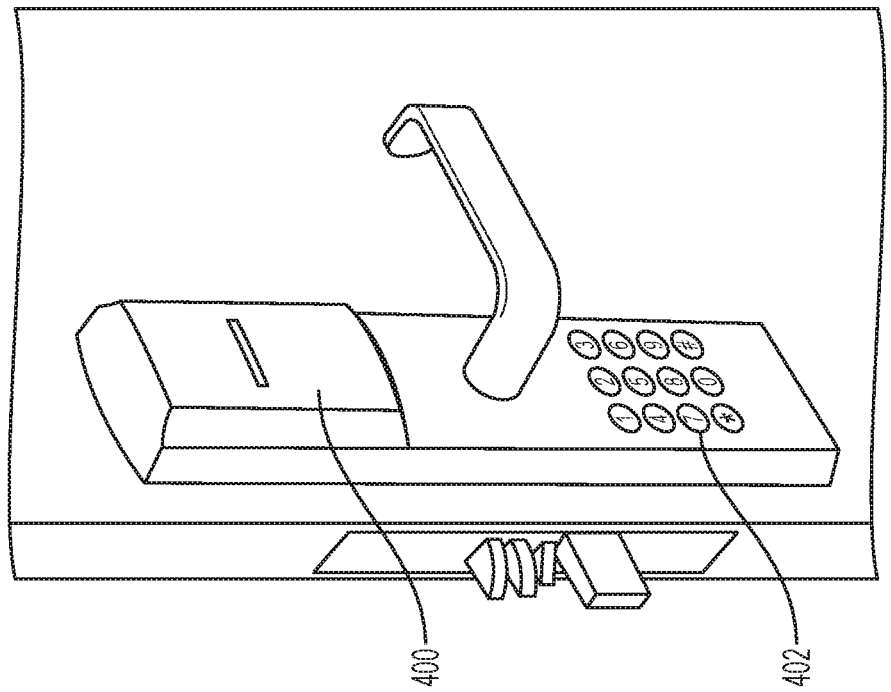
FIG. 4A illustrates an example electromechanical locking system according to an embodiment.

A processor may obtain a key code using information collected from the multi-factor authentication methods. For instance, in the above example, a processor may obtain a key code by concatenating or combining at least a portion of the information received by the magnetic stripe card reader from a presented magnetic stripe card and the PIN received by the keypad. Additional and/or alternate data manipulation and/or processing techniques may be used within the scope of this disclosure to generate or obtain a key code. Moreover, additional and/or alternate sources of information may be used within the scope of this disclosure. For instance, an electromechanical locking system may include one or more of a magnetic stripe reader, a printed memory label reading device, an RFID reader, a smartcard reader, a combination entry interface, a keypad, a touchscreen, a biometric scanner and/or the like. For example, FIG. 4A illustrates an example electromechanical locking system having an RFID reader 400 and a keypad 402 according to an embodiment. FIG. 4B illustrates an example RFID keycard according to an embodiment.

Referring back to FIG. 2, a lock may apply 202 one or more functions to a key code to generate a proposed access code. A function refers to a manipulation, such as, for example, a cryptographic operation. Example functions may include, without limitation, appending data to a key code, performing a hash of the key code with other data, applying an offset to a key code or variation of a key code, and/or the like. Examples of hash functions that may be used include, without limitation, SHA-512 and BLAKE2.

In an embodiment, at least a portion of a proposed access code represents a position for one or more of the moveable locking elements of a lock. For instance, in various embodiments, a proposed access code may include one or more characters, such as numbers, letters, symbols and/or the like. One or more characters of the proposed access code may correspond to a position of a corresponding moveable locking element. For instance, a proposed access code may be "123", where "1" corresponds to a position for a first moveable locking element of a lock, "2" corresponds to a position for a second moveable locking element of the lock, and "3" corresponds to a position for a third moveable locking element of the lock. Additional and/or alternate codes and/or positions may be used within the scope of this disclosure.

Figure 5:
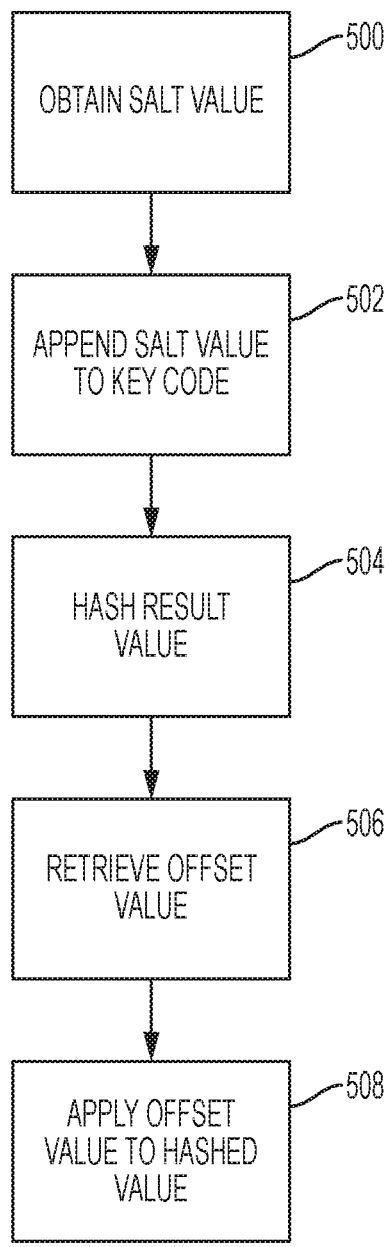
FIG. 5 illustrates an example method of applying one or more functions to a key code according to an embodiment.

FIG. 5 illustrates an example method of applying one or more functions to a key code according to an embodiment. The method illustrated by FIG. 5 is illustrative only, and it is understood that additional and/or alternate ways of performing one or more functions to a key code may be performed within the scope of this disclosure.

As shown in FIG. 5, a lock may obtain 500 a salt value. A lock may obtain 500 a salt value from one or more data stores of the lock or associated with the lock. A salt value may be random data. A salt value may be generated by a lock, or it may be generated by a device other than a lock, and then provided to the lock.

A lock may append 502 the salt value to the key code to generate a result value. The lock may hash 504 the result value to generate a hashed value. Any suitable hashing technique, such as, for example, SHA-256 algorithm, may be used. In an embodiment, a lock may retrieve 506 an offset value. For instance, a lock may retrieve 506 an offset value from a data store of the lock or associated with the lock. The lock may apply 508 the offset value to the hashed value to generate a proposed access code.

In various embodiments, at least a portion of a proposed access code represents a position for one or more of the moveable locking elements of a lock. Referring back to FIG. 2, a lock may instruct 204 one or more actuators of the lock to adjust a position of one or more moveable locking elements of the lock based on the proposed access code. An actuator may adjust a position of one or more moveable locking elements without any mechanical operation of the actuators caused by movement or other engagement of a key. For example, a user may present a mechanical key to a lock by inserting it into a receptacle of the lock. However, the key itself does not mechanically engage the actuators. Rather, the lock obtains information from the key (such as via an optical pattern of the key or one or more physical features of the key) and uses this information to cause the actuators to adjust the position of one or more of the moveable locking elements. This is illustrated further by the examples provided below.

Figure 6A:
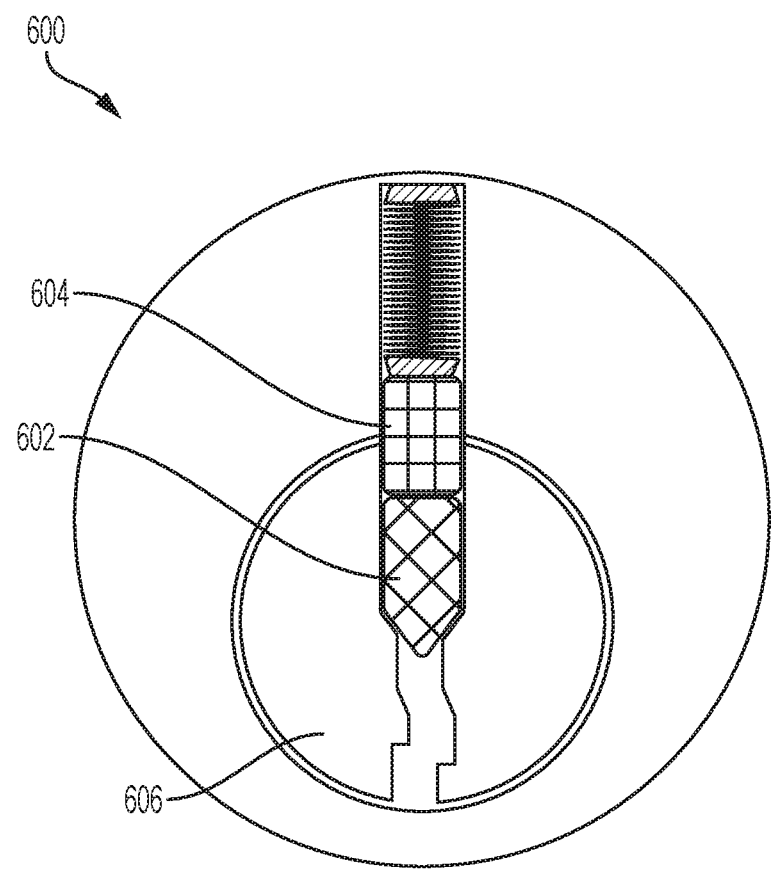
FIG. 6A illustrates an example pin tumbler lock in accordance with the prior art.

FIG. 6A illustrates an example cross-section of a pin tumbler lock in accordance with the prior art. One or more pins of a pin-tumbler lock are examples of moveable locking elements as described above with respect to FIG. 1. As shown by FIG. 6A, a pin tumbler lock 600 includes a key pin 602, a driver pin 604 and a cylinder 606. The key pin 602 and/or the driver pin 604 will prevent the cylinder 606 from turning in the absence of a key that corresponds to the lock.

Figure 6B:
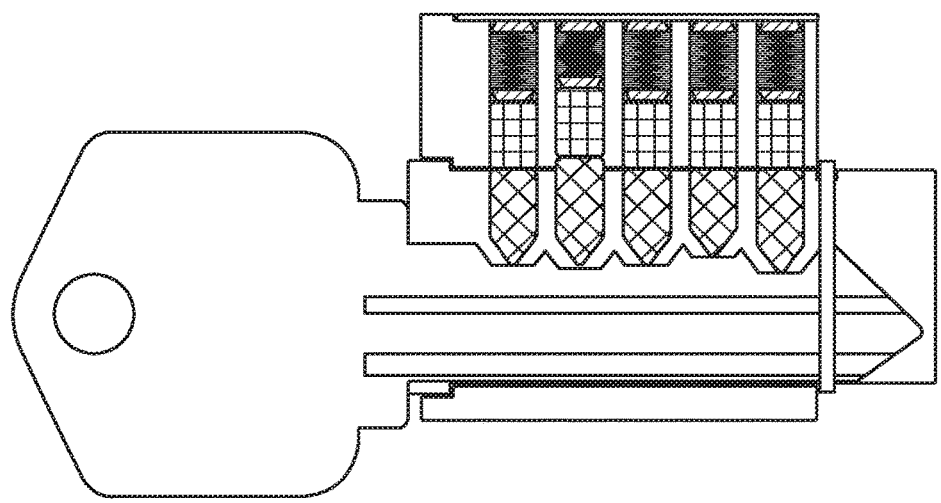
FIG. 6B illustrates an example pin tumbler locking system in accordance with the prior art.

FIG. 6B illustrates a pin tumbler locking system in accordance with the prior art. As illustrated by FIG. 6B, when the correct key is presented to the lock, the pins are moved to a position such that they can turn with the cylinder. The cylinder actuates the bolt or other moveable locking element, allowing a resource (such as a door) to open.

Unlike traditional pin tumbler locking systems (or other known locking systems), the actuators of the locking systems described in this disclosure adjust a position of one or more moveable locking elements without any mechanical operation of the actuators caused by movement or other engagement of a key. In other words, the key itself does not mechanically engage the actuators.

Figure 6C:
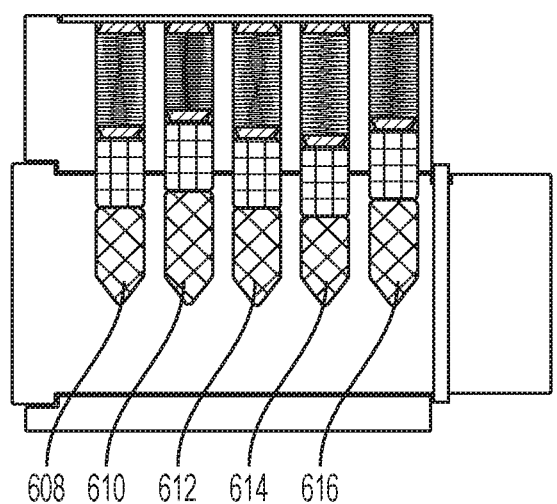
FIG. 6C illustrates an example pin tumbler lock according to an embodiment.

For example, the pin tumbler lock shown in FIG. 6C may be keyed to the code 1-3-2-3-3, meaning that when Pin 1 608 is positioned at a position of '1', Pin 2 610 is positioned at a position of '3', Pin 3 612 is positioned at a position of '2', Pin 4 614 is positioned at a position of '3' and Pin 5 616 is positioned at a position of '3' that the lock will open.

The pin tumbler lock may obtain the key code 2-2-2-1-3 as discussed above with respect to FIG. 5. In this situation, the code is cut into the key itself, so an interface of the lock that receives the key may determine that the key code is 2-2-2-1-3.

The pin tumbler lock may obtain a salt value. For instance, the pin tumbler lock may have the salt value 1 1 1 2 3 2 3 3 3 stored in memory of its processor. The pin tumbler lock may append this salt value to the key code to generate a result value. In this example, the result value is 2 2 2 1 3 1 1 1 2 3 2 3 3 3. The pin tumbler lock may hash the result value, which may result in a hashed value of 3-3-1-2-2.

The pin tumbler lock may retrieve an offset value such as, for example, from its memory. In this example, the offset value retrieved by the lock is 1-3-1-1-1. Applying the offset to the hashed value yields a proposed access code of 1-3-2-3-3. In this example, each of these numbers represents a location of a corresponding pin of the pin tumbler lock as illustrated in Table 1.

TABLE 1

|  | Pin 1 | Pin 2 | Pin 3 | Pin 4 | Pin 5 |
|---|---|---|---|---|---|
| Proposed access code | 1 | 3 | 2 | 3 | 3 |

As discussed above, the proposed access code represents a position for one or more moveable locking elements of the lock. For example, the processor of the pin tumbler lock may instruct the actuator(s) to move Pin 1 to a position represented by '1', Pin 2 to a position represented by '3', Pin 3 to a position represented by '2', Pin 4 to a position represented by '3' and Pin 5 to a position represented by '3.' Because these positions correspond to the pin positions associated with the code to which the lock is keyed, the lock will open.

If an incorrect key is presented to the lock, however, the position of the pins will not allow the lock to open. For instance, an incorrect key having a key code of 2-3-2-1-3 may be presented to the pin tumbler lock from the above example. The lock may append the salt to the key code to generate a result value of 2 3 2 1 3 1 1 1 2 3 2 3 3 3. The lock may hash this result value to yield a hashed value of 3-2-2-3-2. Applying the offset value generates a proposed access code of 1-2-3-1-3. However, moving the pins to positions represented by this proposed access code will not allow the lock to open.

As evident from the above disclosure and examples, a lock is not aware of its own access code. In other words, an access code that unlocks a lock is not stored in a data store of the lock or in a data store that is accessible by the lock. In various embodiments, an access code that unlocks a lock may not be derived from information stored by the lock or by a data store that is accessible to the lock. The access code may only be available to a lock when the key is presented to the lock. For example, an access code that is stored by a key may only be accessible to the lock when the key is engaged with an interface of the lock, such as being inserted into a receptacle of the lock. As such, if a lock is electronically compromised, the information that is stored by the lock, such as, for instance, a salt value and/or an offset value, contain no useful information about any key's key code or the access code for the lock.

Even if a lock is mechanically compromised, and its access code is observed from inspection of its locking mechanism(s), the key code may not be uniquely derivable from the access code. As such, observation of the access code is useless for gaining access to other locks that could be opened by the same key.

It is noted that the above examples describe a pin tumbler lock with five key pins, each of which is selected from one of three lengths. However, additional and/or alternate number of pins and available lengths may be used within the scope of this disclosure. For instance, a lock system may use five key pins, each of which is selected from one of six lengths.

Similarly, although the above examples involve a pin tumbler lock, it is understood that additional and/or alternate locks may be used within the scope of this disclosure. For example, a disc detainer lock may be used where a proposed access code corresponding to the position of one or more rotating discs of the lock is determined. The lock then instructs one or more actuators to adjust the position of one or more rotating discs according to the movement instructions that correspond to the proposed access code.

Figure 7:
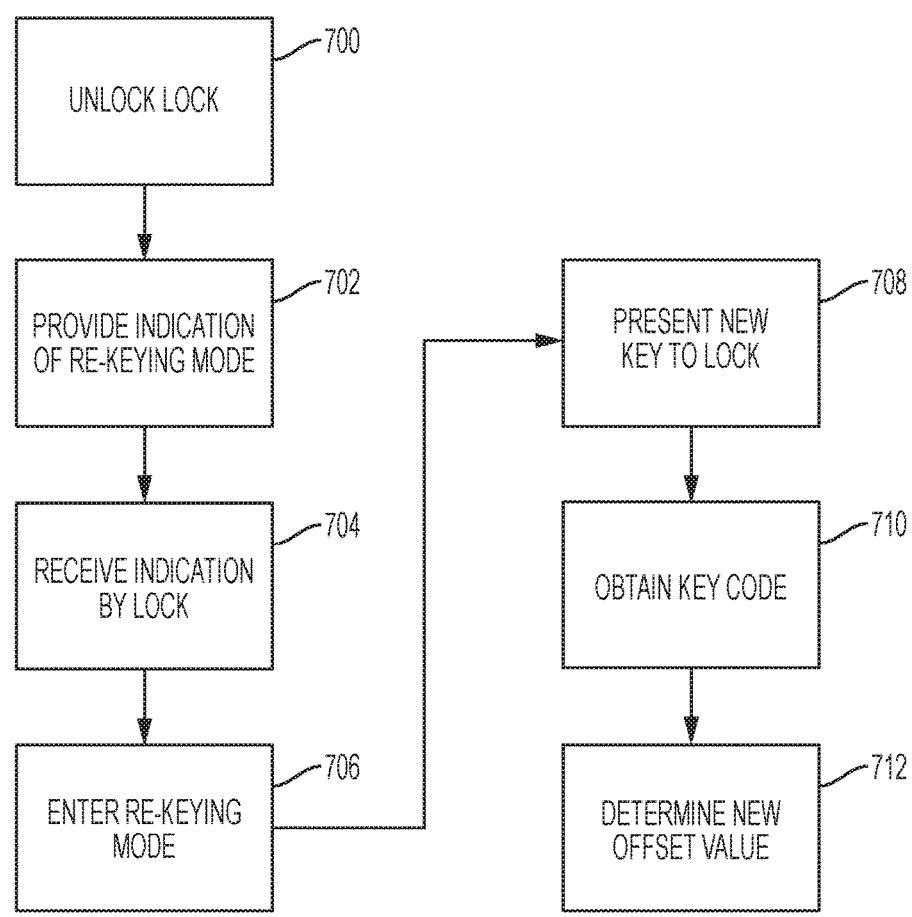
FIG. 7 illustrates an example method of re-keying a lock according to an embodiment.

In various embodiments, a lock may be re-keyed upon request by a user. FIG. 7 illustrates an example method of re-keying a lock according to an embodiment. As illustrated by FIG. 7, a user may open or unlock 700 a lock using a current key. With the lock open, the user may provide 702 an indication to the lock that it is to enter a re-keying mode. For instance, a user may press a button, provide input to the lock or otherwise provide one or more instructions to the lock that it is to enter a re-keying mode. The lock may receive 704 the indication, and may enter 706 a re-keying mode in response.

In an embodiment, the user may present 708 the lock with a new key. The lock may obtain 710 the key code from the new key. In various embodiments, the lock may determine 712 an updated offset value based on the key code from the new key. For example, the lock may append its salt value to the key code for the new key, and may hash the result value. The lock may determine a difference between the old hashed value for the lock and the new hashed value associated with the new key. The lock may then offset the offset value of the lock by the determined difference, and store the result in a data store. In an embodiment, the result may be stored in place of the offset value. As such, a lock may be re-keyed by offsetting the offset value for the lock.

As an example, a lock may receive a key code of 2-2-2-1-3 using a salt value of 1-1 1 2 3 2 3 3 3, which results in a hashed value of 3-3-1-2-2, which is then offset by an offset value of 1-3-1-1-1 to open the lock with an access code of 1-3-2-3-3. A user wishes to re-key the lock to authorize a key code of 2-3-2-1-3.

The user presents the lock with a new key, which the lock salts and hashes to obtain a hashed value of 3-2-2-3-2. The old offset value 1-3-1-1-1 is itself offset by the difference between the hashed values (1-3-1-1-1)+(3-3-1-2-2)−(3-2-2-3-2)=(1-1-3-3-1), and the new offset value 1-1-3-3-1 is stored by the lock. When the new key is presented to the lock, the salted key code 2 2 2 1 3 1 1 1 2 3 2 3 3 3 results in a hashed value of 3-2-2-3-2, which is offset by the new offset value 1-1-3-3-1 to obtain a proposed access code of 1-3-2-3-3, which opens the lock.

In various embodiments, a lock may be part of a master-key system. In such a system, a single key may be used to access multiple different locks. For example, an apartment building may utilize a master-key system. A key, such as one belonging to the building superintendent, administrator, supervisor and/or the like, may be used to unlock all apartment units in the apartment as well as any locks to common areas, such as, for example, lounges, exercise rooms or laundry facilities. As another example, a tenant's key may also be authorized to open more than one lock. For example, a tenant key may unlock the lock of the tenant's apartment, but also the lock of a common area.

In a master-key system, a key may be associated with an authorization level. An authorization level refers to an indication of the rights that are or are not associated with the key. For example, an authorization level may indicate that an owner has the right to create master keys or change keys. As another example, an authorization level may indicate that an owner does not have the right to create master or changed keys.

Figure 8A:
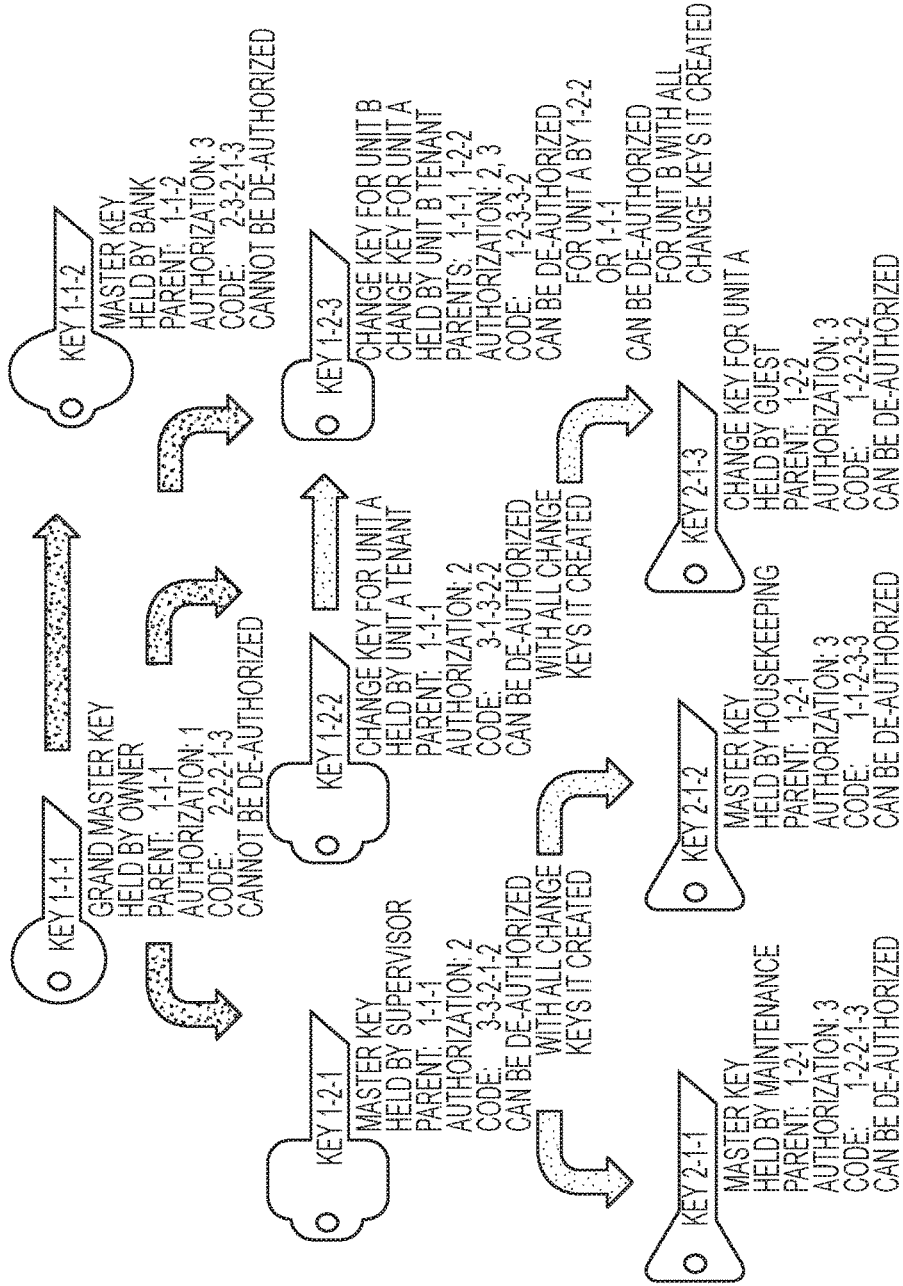
FIG. 8A illustrates an example master-key system according to an embodiment.

FIG. 8A illustrates an example master-key system hierarchy for an apartment complex according to an embodiment. As illustrated by FIG. 8A, Key 1-2-1 may be held by a supervisor. If the supervisor retires, Key 1-2-1 may be de-authorized without affecting Key 2-1-1 or Key 2-1-2. As another example, if the unit A tenant moves out, Key 1-2-2 may be de-authorized along with Key 2-1-3 and Key 1-2-3, but Key 1-2-3 maintains authorization for unit B, and all of the other keys retain authorization for unit A.

A master-key system, such as the one shown in FIG. 8A, may be implemented via one or more data stores that are stored in one or more locks of the system. FIG. 8B illustrates example data stores according to various embodiments. In various embodiments, a key may be associated with a key identifier. A key identifier of a key may be a portion of a key code for the key. A key may present its key identifier and key code to a lock. The lock may look up the key identifier in its data store to obtain key information associated with the key. In another embodiment, a key identifier may be obtained by hashing the key code.

Key information may include an authorization level associated with the key and/or a parent code associated with the key. A parent code refers to an identifier associated with a parent key that created the key. The key information may also include a salt value associated with the key and/or an offset value associated with the key.

In various embodiments, a lock of a master-key system may apply one or more functions to the key code, the key identifier and at least a portion of the key information to generate a proposed access code. For example, a lock may combine the key identifier, the key code, the parent code and the authorization level to generate a preliminary result. The lock may append the salt value to the preliminary result to generate a first intermediate result, and hash the first intermediate result to generate a second intermediate result. The lock may apply the offset value to the second intermediate result to generate the proposed access code. In an embodiment, the lock may instruct one or more actuators of the lock to adjust a position of one or more locking mechanisms of the lock according to the movement instructions represented by the proposed access code.

When the lock is open, authorization of subordinate keys may be enabled, resulting in additions to the lock's data store. Or the lock may be re-keyed by appropriate changes to the data store.

FIG. 9 illustrates example hardware that may be used to contain or implement program instructions. A bus 900 serves as the main information highway interconnecting the other illustrated components of the hardware. CPU 905 is the central processing unit of the system, performing calculations and logic operations required to execute a program. CPU 905, alone or in conjunction with one or more of the other elements disclosed in FIG. 9, is an example of a processor as such term is used within this disclosure. Read only memory (ROM) and random access memory (RAM) constitute examples of non-transitory computer-readable storage media 920, memory devices or data stores as such terms are used within this disclosure.

Program instructions, software or interactive modules for providing the interface and performing any querying or analysis associated with one or more data sets may be stored in the memory device 920. Optionally, the program instructions may be stored on a tangible, non-transitory computer-readable medium such as a compact disk, a digital disk, flash memory, a memory card, a USB drive, an optical disc storage medium and/or other recording medium.

An optional display interface 930 may permit information from the bus 900 to be displayed on the display 935 in audio, visual, graphic or alphanumeric format. Communication with external devices may occur using various communication ports 940. A communication port 940 may be attached to a communications network, such as the Internet or an intranet.

The hardware may also include an interface 945 which allows for receipt of data from input devices such as a keypad 950 or other input device 955 such as a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. An electromechanical locking system comprising:
one or more moveable locking elements;
one or more actuators configured to move each of the one or more moveable locking elements between a plurality of positions that comprise a locked position and an unlocked position;
an interface configured to receive information from a keycard;
a processor; and
a computer-readable storage medium containing programming instructions that are configured to cause the processor to:
when the keycard is detected by the interface, cause the interface to scan the keycard and detect one or more features of the keycard,
identify a first code that corresponds to the detected features of the keycard,
apply one or more functions to the first code to yield a second code, wherein at least a portion of the second code represents one of the plurality of positions for each of the one or more moveable locking elements, and
cause the actuator to move the one or more movable locking elements to the one or more positions that correspond to the second code.

2. The electromechanical locking system of claim 1, wherein:
the interface comprises an optical sensor,
the one or more programming instructions that are configured to cause the processor to detect one or more features of the keycard comprise one or more programming instructions that are configured to cause the processor to cause the optical sensor to detect the first code that is encoded in an optical pattern of the keycard.

3. The electromechanical locking system of claim 1, wherein the one or more programming instructions that are configured to cause the processor to apply one or more functions to the first code to yield a second code comprise one or more programming instructions that are configured to cause the processor to:
obtain a salt value,
append the salt value to the first code to generate a result value,
hash the result value to generate a hashed value,
retrieve an offset value, and
apply the offset value to the hashed value to generate the second code.

4. The electromechanical locking system of claim 1, wherein the one or more programming instructions that are configured to cause the processor to identify a first code comprise one or more programming instructions that are configured to cause the processor to cause the interface to read information from a magnetic stripe of the keycard to obtain the first code.

5. The electromechanical locking system of claim 1, wherein the one or more programming instructions that are configured to cause the processor to identify a first code comprise one or more programming instructions that are configured to cause the processor to cause the interface to read a printed memory label of the keycard to obtain the first code.

6. The electromechanical locking system of claim 1, wherein the one or more programming instructions that are configured to cause the processor to identify a first code comprise one or more programming instructions that are configured to cause the processor to obtain the first code that is stored in a radio frequency identification tag of the keycard.

7. The electromechanical locking system of claim 1, wherein:
the electromechanical locking system further comprises a second interface,
the one or more programming instructions that are configured to cause the processor to identify a first code comprise one or more programming instructions that are configured to cause the processor to:
receive, from the interface, first information;
receive, from the second interface of the electromechanical locking system, second information, and
derive the first code from at least a portion of the first information and at least a portion of the second information.

8. The electromechanical locking system of claim 7, wherein:
the interface comprises a magnetic stripe card reader, and
the second interface comprises one or more of the following:
a keypad, or
a biometric scanner.

9. The electromechanical locking system of claim 7, wherein:
the interface comprises a radio frequency identification reader, and
the second interface comprises one or more of the following:
a keypad, or
a biometric scanner.

10. The electromechanical locking system of claim 1, further comprising additional programming instructions that are configured to cause the processor to:
receive an instruction to enter a re-keying mode;
detect a new keycard by the interface;
cause the interface to scan the new keycard and detect one or more features of the new keycard;
identify a first updated code that corresponds to the detected features of the new keycard;
based on the first updated code, identify a new value that the system will then use with the function to generate the second code upon presentation of the new keycard; and
store the new value in a memory.

11. A method, comprising:
by a processor of an electromechanical locking system:
causing an interface of the electromechanical locking system to scan a keycard and detect one or more features of the keycard when the keycard is detected by the interface,
identifying a first code that corresponds to the detected features of the keycard,
applying one or more functions to the first code to yield a second code, wherein at least a portion of the second code represents one of the plurality of positions for each of one or more moveable locking elements of the electromechanical locking system, and
causing an actuator of the electromechanical locking system to move the one or more movable locking elements to the one or more positions that correspond to the second code.

12. The method of claim 11, wherein:
the interface comprises an optical sensor,
detecting one or more features of the keycard comprises causing the optical sensor to detect the first code that is encoded in an optical pattern of the keycard.

13. The method of claim 11, wherein applying one or more functions to the first code to yield a second code comprises:
obtaining a salt value,
appending the salt value to the first code to generate a result value,
hashing the result value to generate a hashed value,
retrieving an offset value, and
applying the offset value to the hashed value to generate the second code.

14. The method of claim 11, wherein identifying a first code comprises causing the interface to read information from a magnetic stripe of the keycard to obtain the first code.

15. The method claim 11, wherein identifying a first code comprises causing the interface to read a printed memory label of the keycard to obtain the first code.

16. The method of claim 11, wherein identifying a first code comprises obtaining the first code that is stored in a radio frequency identification tag of the keycard.

17. The method of claim 11, wherein identify a first code comprises:
receiving, from the interface, first information;
receive, from a second interface of the electromechanical locking system, second information; and
deriving the first code from at least a portion of the first information and at least a portion of the second information.

18. The method of claim 17, wherein:
the interface comprises a magnetic stripe card reader, and
the second interface comprises one or more of the following:
a keypad, or
a biometric scanner.

19. The method of claim 17, wherein:
the interface comprises a radio frequency identification reader, and
the second interface comprises one or more of the following:
a keypad, or
a biometric scanner.

20. The method of claim 11, further comprising:
receiving an instruction to enter a re-keying mode;
detecting a new keycard by the interface;
causing the interface to scan the new keycard and detect one or more features of the new keycard;
identifying a first updated code that corresponds to the detected features of the new keycard;

based on the first updated code, identifying a new value that the system will then use with the function to generate the second code upon presentation of the new keycard; and storing the new value in a memory.

* * * * *